United States Patent [19]

Smith et al.

[11] Patent Number: 5,492,343
[45] Date of Patent: Feb. 20, 1996

[54] GASKET ASSEMBLY

[75] Inventors: Stanley N. Smith, Farmington; David M. Toth, Brighton, both of Mich.

[73] Assignee: Federal-Mogul Corporation, Southfield, Mich.

[21] Appl. No.: 206,787

[22] Filed: Mar. 4, 1994

[51] Int. Cl.[6] ............................................. F16J 15/12
[52] U.S. Cl. ......................................... 277/180; 277/235 R
[58] Field of Search ............................. 277/11, 166, 180, 277/189, 207 R, 211, 227, 235 R, 235 B, 94

[56] References Cited

U.S. PATENT DOCUMENTS

| | | | |
|---|---|---|---|
| 96,654 | 11/1869 | Andrews | 277/235 R |
| 1,692,857 | 11/1928 | Oven . | |
| 1,846,401 | 2/1932 | Oven . | |
| 1,847,729 | 3/1932 | Shaw . | |
| 1,980,335 | 11/1934 | Hewitt et al. | 288/1 |
| 2,191,044 | 2/1940 | Seligman | 277/235 R X |
| 2,339,478 | 1/1944 | Hoheisel | 288/27 |
| 2,359,118 | 9/1944 | Johnston | 288/26 |
| 3,153,541 | 10/1964 | Rudder | 277/235 R X |
| 3,191,950 | 6/1965 | Hiltner | 277/180 |
| 3,215,442 | 11/1965 | Papenguth | 277/180 |
| 3,448,986 | 6/1969 | Jelinek et al. | 277/180 |
| 3,467,398 | 9/1969 | Bernard | 277/180 |
| 3,473,813 | 10/1969 | Meyers et al. | 277/180 |
| 3,531,133 | 9/1970 | Sheesley et al. | 277/180 |
| 3,643,968 | 2/1972 | Horvath | 277/166 |
| 3,811,689 | 5/1974 | Farnam | 277/166 |
| 3,815,927 | 6/1974 | Geipel | 277/180 |
| 3,874,675 | 4/1975 | Belter et al. | 277/11 |
| 3,909,011 | 9/1975 | Sheesley | 277/180 |
| 3,930,656 | 1/1976 | Jelinek | 277/180 |
| 3,936,059 | 2/1976 | Gordon | 277/166 |
| 4,026,565 | 5/1977 | Jelinek | 277/180 |
| 4,232,496 | 11/1980 | Warkentin | 277/180 |
| 4,272,085 | 6/1981 | Kujikawa et al. | 277/235 |
| 4,400,000 | 8/1983 | Moerk, Jr. | 277/235 |
| 4,535,996 | 8/1985 | Cardis et al. | 277/1 |
| 4,597,583 | 7/1986 | Inciong et al. | 277/235 |
| 4,655,463 | 4/1987 | Inciong et al. | 277/180 |
| 4,719,065 | 1/1988 | Gibbon | 277/235 R X |
| 4,867,461 | 9/1989 | Shimmell | 277/166 |
| 5,054,793 | 10/1991 | Havenstein et al. | 277/180 X |
| 5,121,932 | 6/1992 | Goldman et al. | 277/180 X |
| 5,267,740 | 12/1993 | Stritzke | 277/180 X |

*Primary Examiner*—Thomas B. Will
*Assistant Examiner*—John L. Beres
*Attorney, Agent, or Firm*—Lawrence J. Shurupoff

[57] ABSTRACT

A gasket includes an internal stiffener wire which maintains the semi-rigid shape of the gasket while it is in storage or during the process of its installation between two workpieces. Rigid compression limiter rings are attached to the wire by a tack weld or by semi-open loops formed in the wire. The loops mate with peripheral grooves in the rings. Each ring is secured within a side opening in each loop with a sliding or snap-fit connection. The rings may be loosely held within the loops to allow the rings to self align themselves with positioning pins provided in an injection mold which subsequently forms the gasket material around the wire and rings.

6 Claims, 5 Drawing Sheets

FIG 7
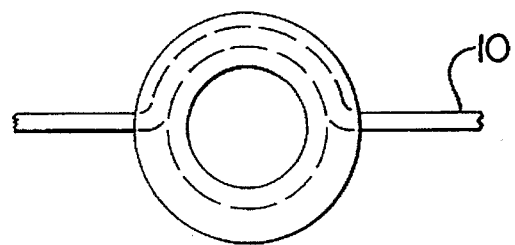
FIG 8
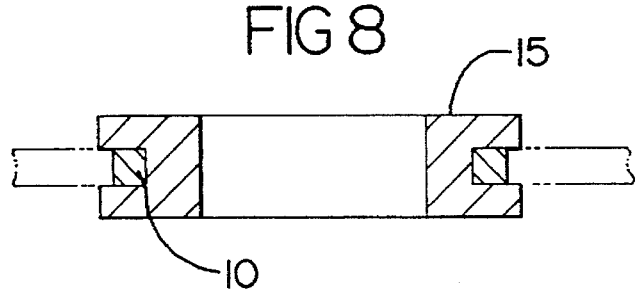
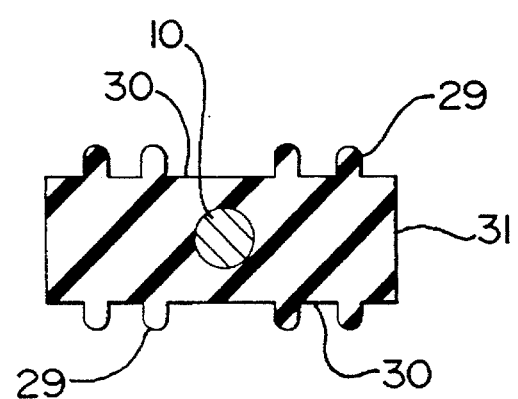
FIG 9

GASKET ASSEMBLY

BACKGROUND OF THE INVENTION

1. Field of the Invention

This invention relates to molded gaskets having compression limiter members and internal wire stiffener members.

2. Description of Prior Developments

Gaskets formed of resilient elastomeric materials are commonly used to seal the interface between various members designed to cooperatively contain or transport fluids. Such gaskets are required to prevent the escape of fluid along a nominally sealed joint.

Quite often such gaskets are formed with through holes located at spaced points around the gasket periphery. These holes accommodate bolts or studs that are used to compress the gasket material between two fluid containment members. Compression of the gasket material deforms it so as to fill minor cracks or crevices that could provide escape routes for the sealed fluid.

However, if the gasket material is overly compressed at localized points, it can extrude out of the sealed joint and stretch to the point of rupture. Moreover, uneven compression of the gasket material surrounding different bolts or studs can warp the gasket to produce leakage paths where the compression is low.

In order to control or limit the compression of elastomeric gaskets, it is a practice to embed rigid members in the gasket, particularly at those points where the fastener bolts or studs extend through the gasket material. Each bolt or stud typically extends through a hole formed within one of the rigid members. The rigidity of these members ensures that the gasket material will not be overly compressed due to overtorquing the studs or bolts. Such members are sometimes referred to as compression limiter rings.

Gaskets formed of elastomeric materials tend to be especially flexible when formed to a durometer suitable for optimum sealing action. Such flexibility or limpness is a disadvantage when the gasket is being installed. A limp rope-like gasket loses its shape so that it becomes difficult to install.

In order to stiffen the gasket so that it maintains a prescribed shape for installation purposes, it is a practice to employ a flexible metal stiffener sheet or wire within the molded gasket material. In some cases, the preformed stiffener is deployed as an insert in the mold used to form the gasket, such that the elastomer is molded around the stiffener.

U.S. Pat. No. 3,191,950 to Hiltner shows a gasket having a number of compression limiter rings disposed at preselected points around the gasket periphery. The axial thickness of each ring is less than the maximum thickness of the gasket, as defined by sealing beads that project from the major faces of the gasket.

The end faces of the rings act as compression limiters when bolts or studs are torqued to connect the members that are to be sealed by the gasket. The rings are formed integrally with an internal stiffener sheet which is coextensive with the face area of the gasket. Two flat annular washers are welded to opposite faces of the stiffener sheet to form a three-piece laminated ring structure.

U.S. Pat. No. 4,535,996 to Cardis et al. shows a molded elastomeric gasket having a stiffener core sheet formed with circular holes. A flanged ring is held in each circular hole by staking areas of the ring side wall against one face of the core sheet. The end faces of the flanged rings are exposed so that the rings can act to limit the compression of the elastomeric gasket material.

U.S. Pat. No. 4,655,463 to Inciong shows a deformable gasket having a metallic stiffener sheet and an array of compression limiter rings spaced around the sheet periphery. Each ring includes two mating ring elements arrangeable on opposite faces of the stiffener sheet, so that one ring element extends through the sheet plane as a press fit in the other element.

Gaskets of the type disclosed in the above-mentioned patents are somewhat expensive, due in part to the cost of the metallic stiffener sheets. Such sheets have to be stamped with mounting holes for receiving the compression limiter rings. Relatively expensive progressive dies are required to form the sheets to the necessary precision. Also, the scrap losses are relatively great because the sheet area circumscribed by the annular sheet must be discarded. Only a small fraction of the total sheet area is used for stiffening purposes in the molded gasket.

SUMMARY OF THE INVENTION

The present invention is directed to a molded elastomeric gasket that includes a formed metal wire element serving as an internal stiffener member. The wire element is bent to a desired configuration and the ends of the wire element may be welded together to form a continuous, closed form element. However, various different wire configurations can be achieved according to the size and shape of the gasket, e.g., a circular shape, a rectangular shape, or any irregular shape which generally conforms to the shape of the gasket.

Use of metal wire as a gasket stiffener member is advantageous in that scrap losses are significantly reduced, as compared to sheet metal stampings. The metal wire is cut to the desired length during or prior to the wire bending operation, such that all of the wire is used. Scrap losses are essentially zero.

Another advantage is that no specially dedicated, single-use tooling is required to form the wire into a desired configuration. A commercial wire bending machine can be programmed to form different wire shapes for different gasket applications.

In practicing the invention, the wire bending operation includes the sub-steps of forming small loops at preselected points along the length of the wire. Each loop forms an anchorage for a compression limiter member. The bent wire thus constitutes a gasket stiffener and also a compression limiter locator mechanism.

Each compression limiter can be attached to the stiffener wire in various ways, e.g., welding, soldering, crimping, adhesives, or magnetic attachment. However, a preferred method of attachment is a resilient snap-fit connection wherein each compression limiter has a series of semi-closed loop sections engaged within external grooves in spool-shaped rings which serve as the compression limiters. The rings are snapped into the wire loop sections by sliding the rings through the loop side openings. The opening in the side of each wire loop temporarily expands as the ring passes into the loop and then resiliently closes, so that the loop acts as a retainer for the compression limiter ring.

The loop sections of the gasket stiffener wire can be designed to have a loose, sliding fit around the spool-shaped compression limiter rings so that the rings have limited slidable adjustability in the plane defined by the wire stiffener. This may be helpful when the wire stiffener is placed in the mold cavity that molds the elastomer around the wire and compression limiter rings.

That is, the rings can be aligned on locator pins in the mold cavity without undue concern over tolerances on the precise size or shape of the wire stiffener since each ring can be moved about, within limits, so as to accurately position the wire in the mold cavity. Some manufacturing variations in the wire bending operations and resulting dimensional variations in the wire stiffener can be tolerated while still achieving the desired position of the wire and compression limiter rings in the mold cavity. This is achieved by flexing the wire and sliding the compression limiters into position within the mold cavity.

BRIEF DESCRIPTION OF THE DRAWINGS In the drawings:

FIG. 7 is a view taken in the same direction as FIG. 3, but showing a further wire configuration that can be used in practice of the present invention.

FIG. 8 is a sectional view taken on line 8—8 in FIG. 7.

FIG. 9 is an enlarged transverse sectional view taken on line 9—9 in FIG. 2.

DETAILED DESCRIPTION OF THE PREFERRED EMBODIMENTS

Figure 1:
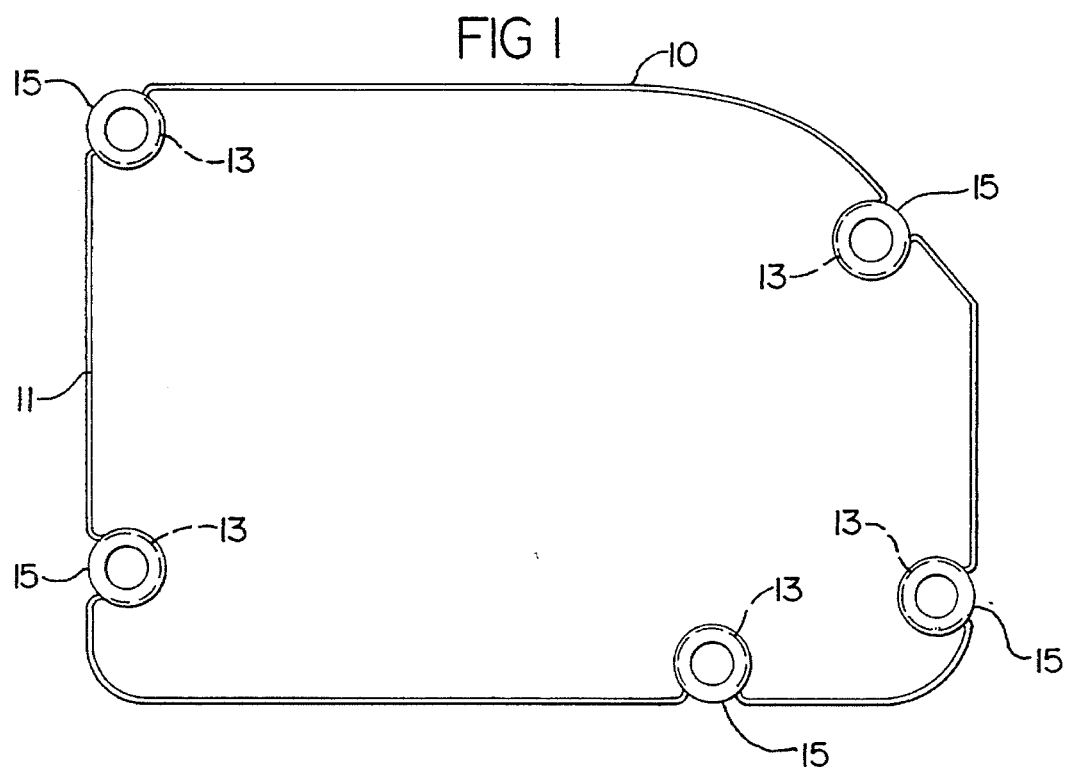
FIG. 1 is a plan view of a wire stiffener and compression limiter ring subassembly that can be used in the annular sealing gasket depicted in FIG. 2.

Referring to FIG. 1, there is shown a metal stiffener wire 10 having an essentially rectangular shape. Corner areas of the rectangle are rounded or angled, as necessary, to make the wire conform to the shape of an associated elastomeric gasket. The final shape of the elastomeric gasket is depicted in FIG. 2.

Figure 2:
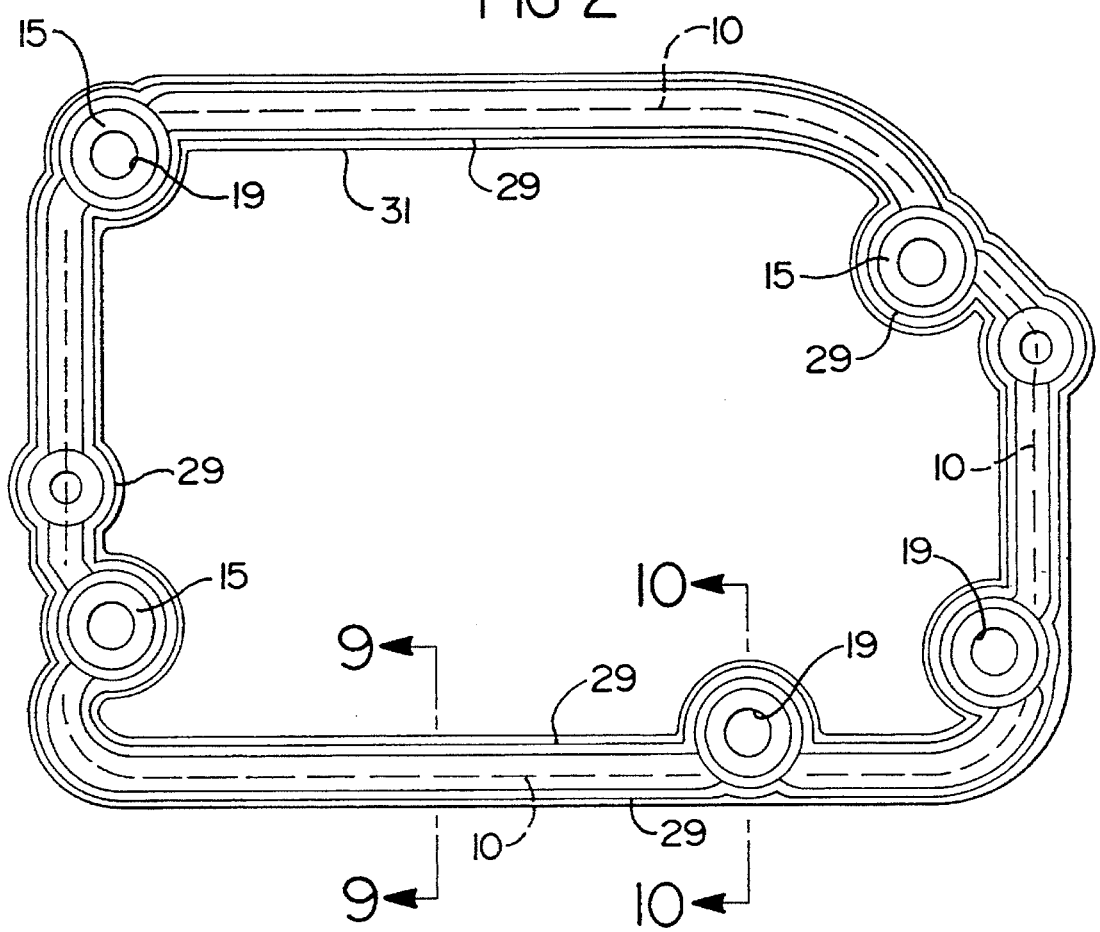
FIG. 2 is a plan view of a sealing gasket constructed according to the present invention.

The shaped wire shown in FIG. 1 is used as an insert in a mold that is used to form the FIG. 2 gasket. The shaped wire acts as an internal stiffener member to give the gasket a definite shape. The internally stiffened gasket can be twisted and deformed manually without damage. However, when the deformation force is removed, the gasket automatically returns to the shape given to it by the molding operation. Wire annulus 10 acts somewhat in the nature of an internal spring.

The somewhat annular wire stiffener 10 is formed out of a single length of carbon steel wire bent on a commercial bending machine to the configuration depicted in FIG. 1. The ends of the wire may be welded together, as at 11, to form an endless closed form structure.

Figure 1A:
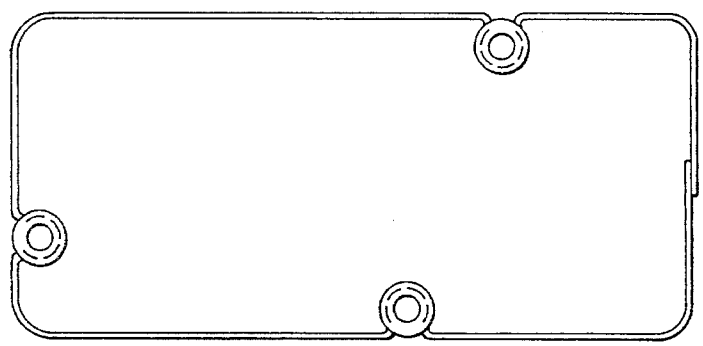
FIG. 1(a) is a plan view of an alternate form of stiffener wire having an open configuration with overlapping free end portions.
Figure 1B:
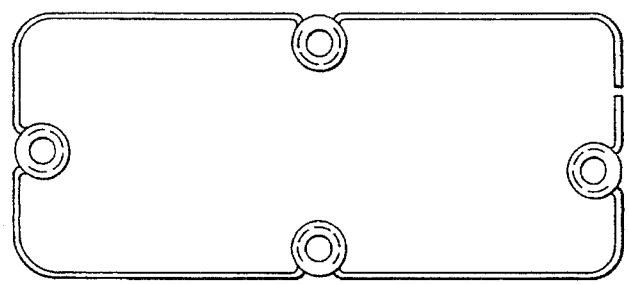
FIG. 1(b) is a plan view of another form of stiffener wire having spaced-apart free end portions.

Alternatively, the ends of the wire may simply freely overlap as shown in FIG. 1(a), or loosely abut or confront one another as shown in FIG. 1(b). Typically, the wire may be a round steel wire having a diameter of about 0.020 to about 0.070 inch or larger. However, a wire having a square, oval or rectangular cross section or any other suitable cross section can also be used. FIGS. 7 and 8 show a square cross-sectioned wire that is suitable for use in practicing the invention.

Referring to FIG. 1, wire 10 is formed with a series of arcuate loop sections 13 at spaced points along the wire annulus. Each loop section provides a mounting surface or engagement area for an individual compression limiter ring 15. FIG. 1 shows five compression limiter rings. However, the number of rings can be varied depending on the size and shape of the sealing gasket in which the wire annulus is used. Moreover, the shape of the compression limiter need not be confined to a ring, insofar as square, semi-circular, oval or any other suitable shape may be used.

Figure 3:
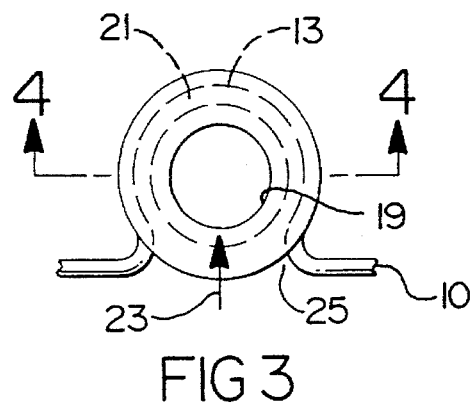
FIG. 3 is a fragmentary enlarged plan view of a compression limiter ring and wire connection used in the FIG. 1 subassembly.
Figure 4:
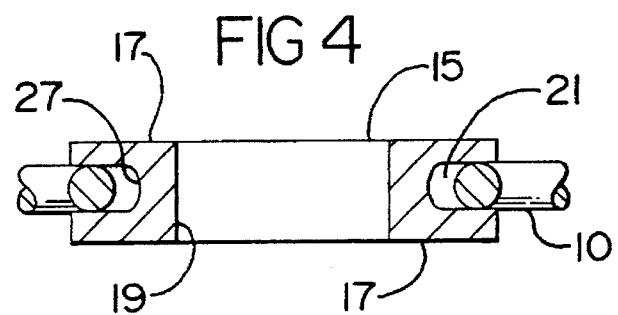
FIG. 4 is a fragmentary sectional view taken on line 4—4 in FIG. 3.

The construction of a representative compression limiter member is shown in FIGS. 3 and 4. The ring 15 has two flat end faces 17, and a circular hole 19 extending therethrough. Typically, hole 19 may have a diameter of about one quarter inch. The outside diameter of the ring may be about one-half inch. An annular groove 21 is formed in the ring side surface.

Figure 10:
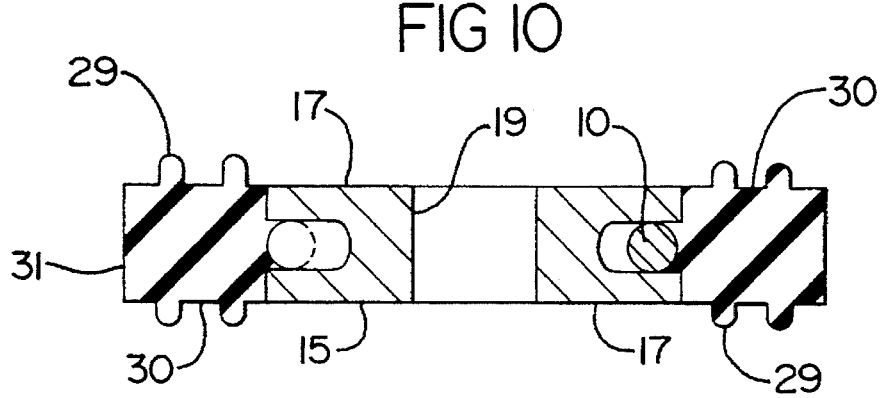
FIG. 10 is an enlarged transverse sectional view taken on line 10—10 in FIG. 2.

Ring 15 forms a rigid bushing for a threaded bolt or stud that is used to fasten together a pair of juxtaposed workpieces that are to be sealed by the FIG. 2 gasket. When the fastener bolt or stud is torqued to a desired foot-pound setting, the end faces 17 of ring 15 contact the workpieces to limit the compression of the elastomeric material surrounding the ring. FIG. 10 shows the relation of the ring to the elastomeric material in the finished gasket.

Each ring 15 can be installed in an associated wire loop section 13 so as to form a subassembly by sliding the ring into the loop, as indicated by arrow 23 in FIG. 3. The side opening 25 in the wire loop has a width that is slightly less than the inner diameter of groove 21 in ring 15. As the ring is moved in the direction of arrow 23, the side arm portions of the wire loop spread apart to permit passage of the ring 15 into the loop. The resilience of the wire material then returns the loop to its original configuration, so that the ring is captured by the loop. Ring 15 thus has a spring-like, snap-fit connection with the C-shaped wire loop 13.

The internal depth dimension 27 of groove 21 is somewhat less than the internal diameter of wire loop 13. Accordingly, ring 15 is capable of limited slidable adjustment within the loop while still being retained by the wire loop. Such adjustment may be only several thousandths of an inch, but it is helpful when the FIG. 1 subassembly is positioned in a mold cavity for the formation of the elastomeric gasket.

Typically, the mold cavity will have a series of locator pins sized to fit the holes 19 in rings 15. The slight adjustability of the rings in wire loops 13 facilitates the simultaneous fitting of the various rings on the locator pins in the mold cavity some further adjustment of the rings is possible because of the nature of the closed form wire annulus. The wire can be easily bent or pulled in various directions so as to make the rings fit over the mold locator pins, even when the wire annulus is slightly out of tolerance as regards its shape or size.

FIG. 2 illustrates a molded gasket provided with the FIG. 1 stiffener wire as an insert. The dashed line 10 in FIG. 2 illustrates the general location of the wire in the elastomeric gasket body. FIGS. 9 and 10 show the location of the stiffener wire relative to the external surfaces of the elastomeric gasket body. The wire cross section has a general central location relative to the elastomer cross section. During the molding operation, the stiffener wire is held in a desired condition or position by reason of the disposition of rings 15 on the locator pins in the mold cavity.

As shown in FIGS. 9 and 10, multiple sealing beads or ribs 29 projecting from both major surfaces 30 of the elastomeric gasket body 31. When the gasket is operatively positioned between two workpieces, beads 29 will be squeezed or deformed so that the bead surfaces are generally coplanar with elastomer surfaces 30.

Ring 15 acts as a compression limiter to limit the deformation of beads 29. Groove 21 in ring 15 is located in a plane midway between ring end faces 17 such that wire 10 is located midway between gasket surfaces 30.

FIG. 2 illustrates the general shape of the gasket and the directions taken by sealing beads 29. Because of the small scale of FIG. 2, the sealing beads 29 appear as single lines.

Figure 5:
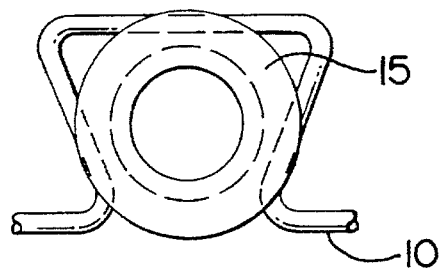
FIGS. 5 and 6 are views taken in the same direction as FIG. 3, but showing alternate configurations for connecting the compression limiter ring to the stiffener wire.

FIGS. 5 through 8 show alternate wire loop configurations that can be used in the practice of the invention. As shown in FIG. 5, the wire loop has a generally open trapezoidal shape. The internal surfaces of the trapezoidal loop are spaced apart slightly greater than the depth of the groove in ring 15 so that the ring has a loose sliding fit in the trapezoidal wire loop.

With the arrangements of FIGS. 3 and 5, the wire loop sections encircle or engage about three-fourths of the circumferential length of groove 21 in ring 15. In order to obtain a snap-fit connection between the wire loop and the compression limiter ring, the wire loop has to extend around more than one-half the circumferential length of the groove in ring 15.

Figure 6:
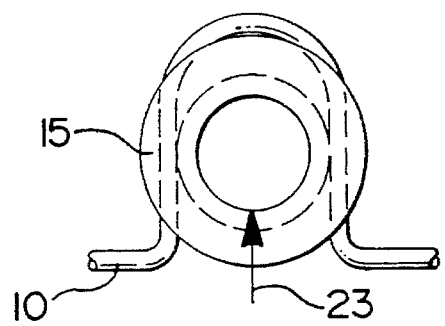

FIG. 6 shows a wire loop having a U-shape. The ring is installed and retained in the wire loop with a light friction fit by sliding it into the loop as indicated by arrow 23 in FIG. 6. The motion is a straight sliding action without the resilient snap-fit spring action that characterizes the wire loops of FIGS. 3 and 5.

FIGS. 7 and 8 show the stiffener wire as having a square or rectangular cross section. The ring-engagement loop portion of the wire extends around approximately one-half of the ring groove length. The ring may be attached to the wire by adhesives or by welding, brazing or soldering.

Figure 11:
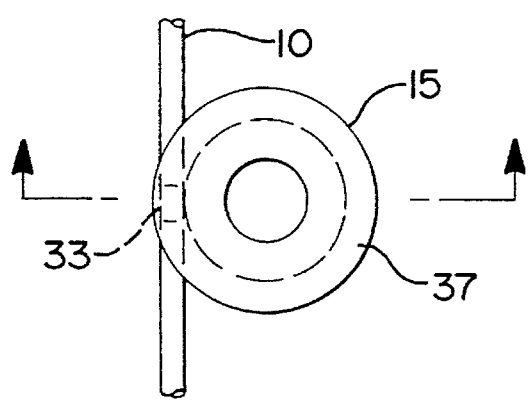
FIGS. 11 and 12 are views taken in the same directions as FIGS. 7 and 8, but illustrating alternate forms of the invention.
Figure 12:
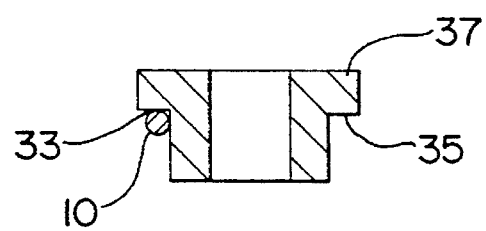

One version of this concept is to use a flanged compression limiter and tack weld it to a wire of either square or rectangular shape. In this case, the compression limiter may be located within a loop in the wire or simply connected to a straight, unbent portion of the wire as shown in FIGS. 11 and 12. In this case, tack weld 33 is formed between the underside 35 of flange 37 of compression limiter 15 and stiffener wire 10. The wire may be slightly radially spaced apart from the tubular body of the compression limiter or in contact with it. As an alternative method of connection, the ring can be magnetically polarized to maintain the desired ring-wire relationship.

The illustrated internal stiffener and compression limiter mechanism is advantageous in that scrap losses are virtually zero. The wire is cut to a desired length such that there is no wire waste. Corresponding stiffeners formed out of sheet metal have considerable waste because the material cut from the sheet to form the annulus must be discarded.

Another factor of some practical importance is that the flexible wire annulus can be resiliently reshaped to position the compression limiter rings 15 on the locator pins in the mold cavity. Relatively large tolerances can be used for the wire bending operations. With stiffeners formed out of sheet metal, the holes for the compression limiter rings have to be located with a considerable degree of precision. Usually a progressive die system is required for blanking the sheet and forming the various holes in separate operations.

The drawings show specific part configurations and arrangements that can be used in the practice of the invention. However, it will be appreciated that the invention can be practiced in various forms.

What is claimed is:

1. A sealing gasket, comprising:

a metal stiffener wire formed into a predetermined configuration;

a plurality of rigid compression limiter members secured to said stiffener wire at spaced points therealong; and an elastomeric sealing body enveloping said stiffener wire, wherein each compression limiter member has a side surface and a peripheral groove formed in said side surface and said stiffener wire comprises an engagement section extending within said peripheral groove and wherein said stiffener wire has a resilient snap-fit connection with said peripheral groove.

2. The sealing gasket of claim 1, wherein each said engagement section of said stiffener wire comprises a C-shaped loop.

3. The sealing gasket of claim 1, wherein each said engagement section comprises a U-shaped loop.

4. A sealing gasket, comprising:

a metal stiffener wire formed into a predetermined configuration;

a plurality of rigid compression limiter members secured to said stiffener wire at spaced points therealong; and an elastomeric sealing body enveloping said stiffener wire wherein each compression limiter member has a side surface and a peripheral groove formed in said side surface and said stiffener wire comprises an engagement section extending within said peripheral groove, and wherein said peripheral groove in each said compression limiter member has a depth dimension slightly greater than the corresponding dimension of said wire engagement section to allow limited adjustability of said compression limiter member with respect to said stiffener wire.

5. A sealing gasket, comprising:

a metal stiffener wire formed into a predetermined configuration defining a plurality of looped portions spaced along said wire;

a plurality of rigid compression limiter rings respectively secured to said looped portions of said stiffener wire;

each ring comprising a side surface having a peripheral groove formed therein, and each of said looped portions respectively extending within one said groove; and an elastomeric sealing body molded to said stiffener wire and to said rings.

6. A sealing gasket, comprising:

a metal stiffener wire formed into a predetermined configuration;

a plurality of rigid compression limiter members secured to said stiffener wire, said compression limiter members comprising a flanged portion having an underside; and a weld interconnecting said compression limiter members to said stiffener wires, said weld extending between said underside of said flanged portion and said stiffener wire; and an elastomeric sealing body molded to said stiffener wire.

* * * * *